United States Patent

Unekawa

[11] Patent Number: 5,822,316
[45] Date of Patent: Oct. 13, 1998

[54] ATM SWITCH ADDRESS GENERATING CIRCUIT

[75] Inventor: Yasuo Unekawa, Kawasaki, Japan

[73] Assignee: Kabushiki Kaisha Toshiba, Tokyo, Japan

[21] Appl. No.: 680,433

[22] Filed: Jul. 15, 1996

[30] Foreign Application Priority Data

Jul. 17, 1995 [JP] Japan .................................. 7-180148

[51] Int. Cl.⁶ .................................................. H04L 12/56
[52] U.S. Cl. ........................... 370/389; 370/428; 370/395
[58] Field of Search .................................. 370/389, 394,
370/395, 412, 413, 414, 415, 416, 417,
418, 428, 419, 397, 399, 398, 392, 409

[56] References Cited

U.S. PATENT DOCUMENTS 5,272,696  12/1993  Munter et al. ........................... 370/412
5,311,509   5/1994  Heddes et al. .......................... 370/412

*Primary Examiner*—Dang Ton
*Attorney, Agent, or Firm*—Loeb & Loeb LLP

[57] ABSTRACT

The proposed address generating circuit of a shared-buffer type ATM (asynchronous transfer mode) switch adopts such an address management method that the ports multi-plexed by time division for each input link can be switched to each output link through time division multiplexing. The address generating circuit of shared-buffer type ATM switch used for an ATM switching system comprises a plurality of address generating units (4) each for storing an address, port data and output link data of a cell stored in each shared buffer in time series manner; two port pointer registers (8a, 8b, 8c, . . .) for storing data indicative of a current output port for each output link; and a port list table (9) for storing data of ports accommodated in each output link.

9 Claims, 17 Drawing Sheets

ATM SWITCH ADDRESS GENERATING CIRCUIT

BACKGROUND OF THE INVENTION

1. Field of the Invention

The present invention relates to an ATM (asynchronous transfer mode) switch address generating circuit, and more specifically to an address generating circuit of shared-buffer type ATM switch used for an ATM switching system.

2. Description of the Prior Art

The ATM switch realizes such operation that each data cell can be switched to each destination on the basis of each destination data (referred to as routing tag, herein-after) added to each ATM cell. Here, the ATM switch can be classified into input-buffer type, output-buffer type, and shared-buffer type according to the arrangement of the cell buffers each for accumulating each data cell. Here, in general, when the total number of the cell buffers is constant, the shared-buffer type ATM switch is the most excellent in the cell loss rate characteristics.

Further, as buffer address management systems for the shared-buffer type ATM switch, a linked list system, a shift register system, etc. are so far known.

In the ATM switch of the ATM switch system as described above, there exists a multicasting function as one of the functions realized by the ATM switch. The multicasting function is such a function that input cells are copied and then outputted through a plurality of output ports. However, when the multicasting is realized by the linked list system, some problems arise in that (1) the throughput of the multicasting is limited; (2) the cell buffers cannot be utilized effectively; etc. In contrast with this, in the case of the shift register system, the multicasting can be realized easily by preparing a plurality of registers for storing the routing tags, whose number is the same as that of the output links, as described hereinbelow.

Here, the summary of a prior art address generating circuit for realizing the shift-register type address management system will be explained hereinbelow with reference to FIG. 11.

In FIG. 11, a plurality of address generating units 104 are connected to each other in a loop state through a routing tag input bus 105, a control bus 106, and an address pointer output bus 107 each corresponding to each address generating unit 104. Each address generating unit 104 is composed of a routing tag register 101 for storing a cell routing tag (destination data of a cell), an address pointer register 102 for storing an address of each cell buffer (not shown in FIG. 12) for storing each data cell, and a column control circuit 103 for controlling these elements. Further, cell routing tags are transferred to the routing tag input bus 105 through a switch input section (not shown), and control data of the address generating circuit are transferred to the control bus 106, respectively. Further, the write addresses in the cell buffers and the read addresses from the cell buffers are all transferred to the address pointer output bus 107, respectively.

The positional relationship of the respective address generating units 104 corresponds to cell arrival sequences; that is, the arrival times of the cells corresponding to the address generating units 104 positioned on the lower side are earlier than the arrival times of the cells corresponding to the address generating units 104 positioned on the upper side in FIG. 12. Therefore, in order to output the data cells to be transmitted to an output link in accordance with the correct time sequence, the address generating circuits are searched beginning from the lower side, to detect the address generating units 104 in each of which the routing tag to be transmitted to the output link is stored, in sequence. Here, an address stored in the address pointer register 102 of the detected address generating unit 104 is a read address of the cell buffer.

In the address generating circuit, the address management of the shift register type can be realized on the basis of a series of three operations such as input operation, output operation and shift operation as follows:

The input operation is effected whenever data cells are inputted. During the data cell input, the routing tags attached to the cells are transferred to the address generating circuit, and the vacant columns of the address generating circuit are searched from the lower side. Further, the routing tag is inputted to the first-searched vacant column, and the address pointer value of the searched vacant column is transferred to the cell buffer, so that the data cell can be written in the cell buffer.

FIG. 12 to 16 show the internal states of the address generating circuit 108 and the cell buffers 109, respectively. FIGS. 12 shows the initial internal states of both; FIG. 13 shows the internal states of both obtained when a cell A having a routing tag 0 has been inputted from the internal states shown in FIG. 12; FIG. 14 shows the internal states of both obtained when a cell B having a routing tag 1 has been inputted from the internal states shown in FIG. 13; FIG. 15 shows the internal states of both obtained when a cell C having a routing tag 1 has been inputted from the internal states shown in FIG. 14; and FIG. 16 shows the internal states of both obtained when a cell D having a routing tag 0 has been inputted from the internal states shown in FIG. 15, respectively. That is, FIGS. 13 to 16 show the changes in the internal states of the address generating circuit 108 and the cell buffers 109 beginning from the initial states shown in FIG. 12 in time series manner. The output operation is effected whenever data cells are outputted. During the cell output, the columns of the address generating circuit, which have the routing tags matching the output link, are searched from the lower side, and the address pointer value of the first-searched column is transferred to the cell buffer to read the cell from the cell buffer. Further, the routing tag of the outputted column is reset to a vacant column. That is, the cell form which a cell has been already outputted becomes a vacant column.

FIGS. 17 shows the internal states of the address generating circuit 108 and the cell buffers 109 obtained when the cell A to be transmitted to the output link "0" has been outputted from the internal states shown in FIG. 16; and FIGS. 18 shows the internal states of both obtained when the cell B to be transmitted to the output link "1" has been outputted from the internal states shown in FIG. 17. That is, FIGS. 17 to 18 show the changes in the internal states of the address generating circuit 108 and the cell buffers 109 beginning from the internal states shown in FIG. 16 in time series manner.

The shift operation is effected to fill the vacant columns caused by the output operation with data. During the shift operation, the vacant columns of the address generating circuit 108 are searched from the lower side, and the address pointer value of the first-searched vacant column is outputted to the address pointer output bus 107. Further, at the same time, the values of the column just over the first-searched vacant column are shifted to the one-stage lower column (the same as the first-searched column). Further, the address pointer value outputted to the address pointer output bus 107 is inputted to the uppermost column.

FIG. 19 shows the internal states of the address generating circuit 108 and the cell buffers 109 obtained after the first shift has been executed from the states shown in FIG. 18 to fill one vacant column; and FIG. 20 shows the internal states of the address generating circuit 108 and the cell buffers 109 obtained after the second shift has been executed from the states shown in FIG. 19 to fill another vacant column.

In the above-mentioned address generating circuit, the multicasting function can be realized easily by preparing a plurality of the routing tag registers 101 whose number is the same as that of the output links. For instance, when four output links are provided, as shown in FIG. 21, each bit of the routing tag registers 101 is allowed to correspond to each output link (in one-to-one correspondence relationship), and a bit (e.g., "1") is set to each of the routing tag registers 110 which corresponds to the output links to be multicasted. Although the input operation and the shift operation of the multicasting are both the same as those already explained, the output operation is different from the operation already explained merely in that the routing tag bits corresponding to the output links of the columns from which the cells have been outputted are reset.

In the prior art shared-buffer type ATM switch which adopts the shift register type address management system as described above, the switching operation has been so far made in unit of link. However, there exists the case where each link is divided into a plurality of time slots and further a port is allocated to each time slot for time division multiplexing, in order to make use of a network effectively. For instance, in the case of a switch having a line speed of 622Mbps for each link, four ports each having a line speed of 156Mbps are inputted as a single link multiplexed by time division.

In the prior art ATM switch, however, when a single link is multiplexed by time division as described above, since the switching operation has been so far made on the basis of only the link data, the line flow control is executed in minimum unit of link, with the result that it has been impossible to control the link more finely in unit of port.

As described above, in the prior art shared-buffer type ATM switch, the ATM switching operation is executed only in unit of link; in other words, it has been impossible to execute the switching operation in unit of port. Therefore, there exist some problems in that the switching operation cannot be used and managed effectively and further finely.

SUMMARY OF THE INVENTION

With these problems in mind, therefore, it is the object of the present invention to provide an address generating circuit of a shared-buffer type ATM (asynchronous transfer mode) switch usable for the ATM switch system, which adopts such an address management method that the ports multiplexed by time division for each input link can be switched to each output link through time division multiplexing.

To achieve the above-mentioned object, the present invention provides an address generating circuit of shared buffer type asynchronous transfer mode switch used for an asynchronous transfer mode switching system, which comprises: a plurality of address generating units (4) each having: a routing tag register (1) for storing routing tag data composed of each cell port data and each cell output link data; and an address pointer register (2) for storing a write address of each cell in a cell buffer or a read address of each cell from the cell buffer; a plurality of port pointer registers (8a, 8b) connected to said address generating units (4) and provided for each output link, for storing data indicative of a current output port for each output link; and a port list table (9) provided in common for all the output links, for storing port data each having an address, said port list table rewriting data of said port pointer register (8a or 8b) by giving each port data to said port pointer register (8a or 8b); whenever a cell related to said address generating unit having output port data for each output link stored in said port pointer register (8a or 8b) is read, port data stored in said port list table (9) and to be given next to said port pointer register (8a or 8b) being obtained by searching said port list table (9) by using data stored in said port pointer register (8a or 8b) as an address.

Here, each of said address generating units (4) further comprises a control circuit (3) for controlling input/output of said routing tag register (1) and said address pointer register (2).

Further, the address generating circuit further comprises: a routing tag input bus (5) connected to said routing tag registers (1) of said respectively address generating units (4), for transferring routing tags from an external address inputting section to said routing tag registers (1), respectively; a control bus (6) connected to said control circuits (3) of said respectively address generating units (4), for transferring control data to said control circuits (3), respectively; and an address pointer output bus (7) connected to said address pointer registers (2) of said respective address generating units (4), for transferring read addresses or write addresses of cells to be stored in said address pointer registers (2), respectively.

Further, the address generating circuit further comprises a link/port control circuit (10) for controlling input/output of said port pointer registers (8a, 8b) and input/output of said port list table (9).

Further, the present invention provides an address generating circuit of shared buffer type asynchronous transfer mode switch used for an asynchronous transfer mode switching system, which comprises: first storing means (4) for storing addresses, port data, and output link data of cells stored in a shared buffer; second storing means (8a, 8b) for storing data indicative of a current output port for each link; and third storing means (9) for storing port data stored for each output link, and wherein an address of an output cell corresponding to the data indicative of the output port stored in said second storing means (8a, 8b) is searched from said first storing means (4), and further data indicative of succeeding output port is read from said third storming means (9) by using the data indicative of an output port stored in said second storing means (8a, 8b) as an address.

Here, the address generating circuit is initialized by setting an output port stored in each output link to said third storing means (9), by setting the port data in such a way that the written port data can be used as an address for reading the succeeding port data, and by setting head port data for each output link to said second storing means (8a, 8b).

Further, the present invention provides an address generating circuit of shared buffer type asynchronous transfer mode switch used for an asynchronous transfer mode switching system, which comprises: a plurality of address generating units (4) mutually connected in loop form, each including: a routing tag register (1) for storing a routing tag having cell port data and output link data; an address pointer register (2) for storing a read address of a cell read from a cell buffer (11) or a write address of a cell written in the cell buffer (11); and a column control circuit (3) for controlling input/output of said routing tag register (1) and said address pointer register (2); a routing tag input bus (5) connected to said routing tag registers (1) of said respectively address generating units (4), for transferring routing tags from an external address inputting section to said routing tag registers (1), respectively; a control bus (6) connected to said column control circuits (3) of said respectively address generating units (4), for transferring control data to said column control circuits (3), respectively; an address pointer output bus (7) connected to said address pointer registers (2) of said respective address generating units (4), for transferring read addresses or write addresses of cells stored in said address pointer registers (2), respectively; two port pointer registers (8a, 8b) connected to said control bus (6), for storing data indicative of current output port data for each output link and for transmitting the stored data to said column control circuits (3) via said control bus (6), respectively; a port list table (9) connected to said control bus (6) in common for all the output links, for storing port data for each output link and for transmitting stored port data to said port pointer registers (8a, 8b), respectively; and a link/port control circuit (10) for controlling input/output of said port pointer registers (8a, 8b) and said port list table (9).

DETAILED DESCRIPTION OF THE PREFERRED EMBODIMENTS

Figure 1A:
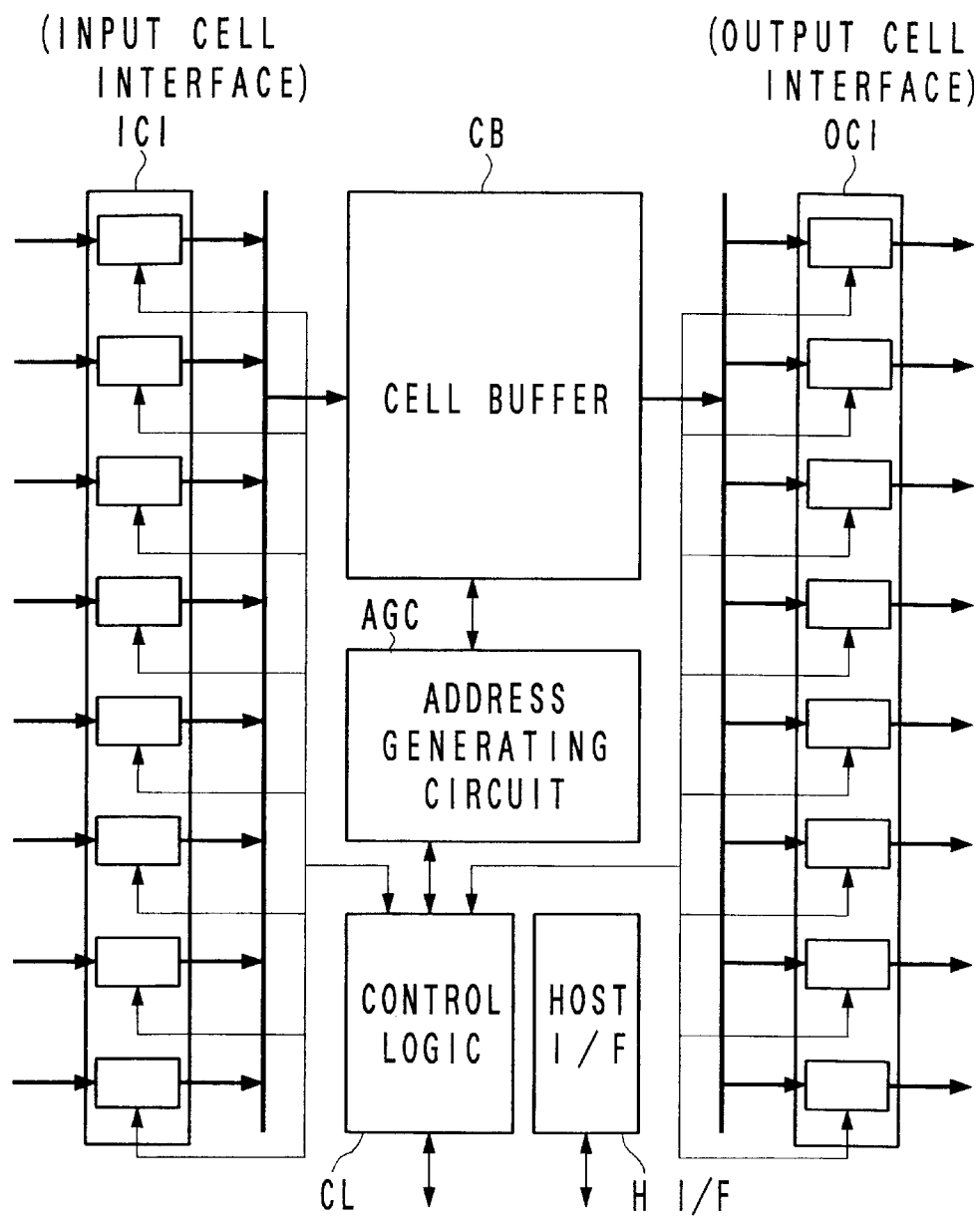
FIG. 1A is a circuit diagram showing an embodiment of shared buffer type ATM switch according to the present invention.

FIG. 1A shows a shared buffer type ATM switch having ICI (Input Cell Interface), CB (Cell Buffer), AGC (Address Generating Circuit), CL (Control Logic), H I/F (Host I/F) and OCI (Output Cell Interface).

An embodiment of the address generating circuit (AGC) for an ATM (asynchronous transfer mode) switch according to the present invention will be described hereinbelow with reference to the attached drawings.

For brevity, an example of the ATM switch having two input links, and two output links will be explained hereinbelow. However, without being limited only to the above example, the present invention can be applied to any ATM switches having any numbers of the input links, the output links, and the output ports.

Figure 1B:
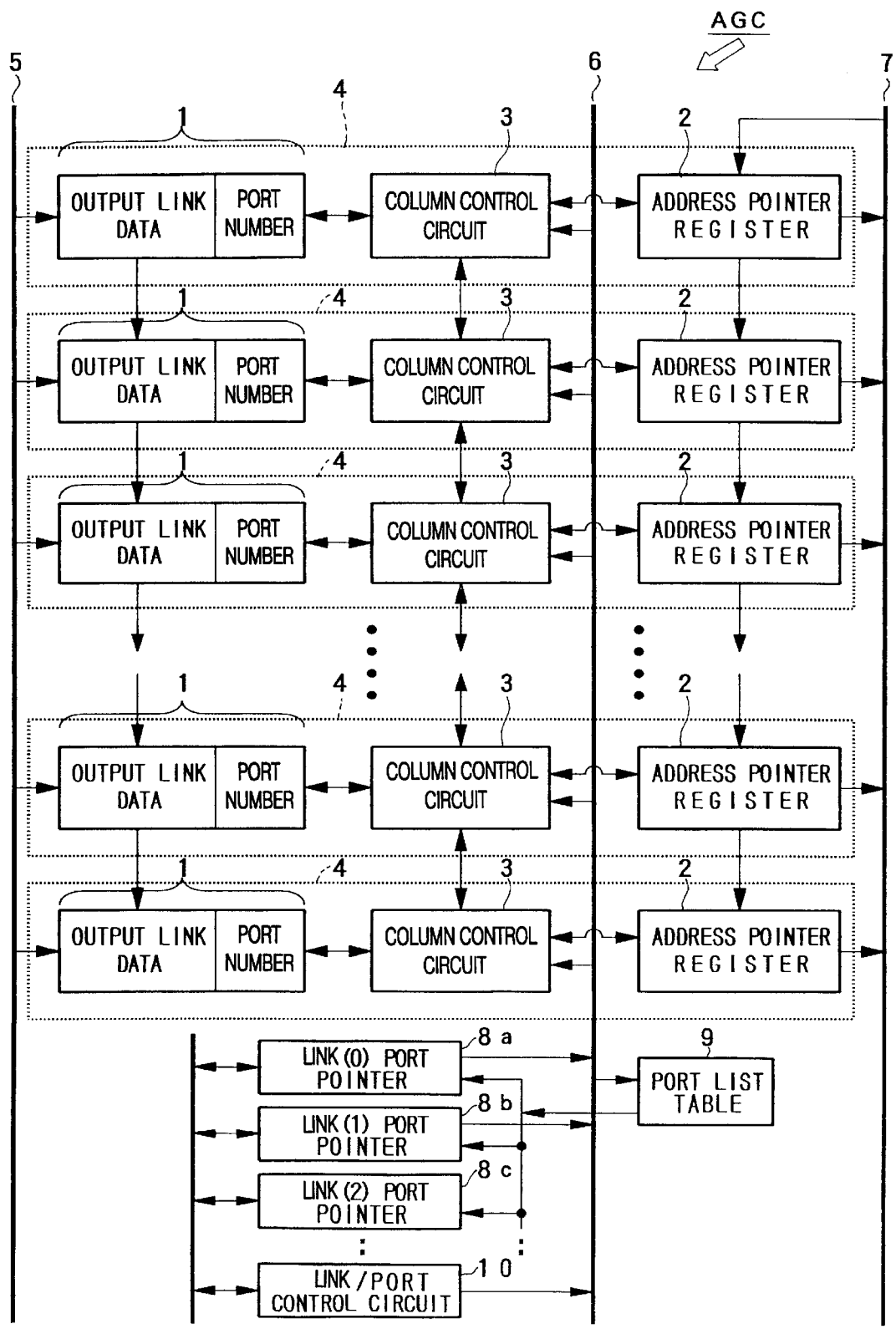
FIG. 1B is a circuit diagram showing an embodiment of the address generating circuit of an ATM switch according to the present invention.

In FIG. 1B, the address generating circuit (AGC) of the shared-buffer type ATM switch for an ATM switch system is composed of a plurality of address generating units 4 each connected in a loop state through a routing tag (i.e., destination data) input bus 5, a control bus 6 and an address pointer output bus 7; two link port pointer registers 8a and 8b; a port list table 9, and a link/port control circuit 10. Each address generating unit 4 is composed of a routing tag register 1, an address pointer register 2, and a column control circuit 3.

The routing tag register 1 stores destination data (cell routing tags) such as output link data and port data (number).

The address pointer register 2 stores a read address of each data cell read from a cell buffer or a write address of each data cell stored in a cell buffer. The column control circuit 3 controls the input and output of the routing tag register 1 and the address pointer register 2.

The routing tag input bus 5 is connected to the routing tag registers 1 of the respective address generating units 4, to transfer routing tags from an external address input section (not shown) to the respective routing tag registers 1. The control bus 6 is connected to the column control circuits 3 of the respective address generating units 4, to transfer control data to the column control circuits 3. The address pointer output bus 7 is connected to the address pointer registers 2 of the address generating units 4, to transfer read addresses or write addresses of cell data stored in the address pointer registers 2.

Further, the port pointer registers 8a, 8b, 8c, . . . are connected to the control bus 6, to store data (output port numbers) indicative of the current output ports for each output link. The stored data are given to the column control circuits 3 through the control bus 6. The port list table 9 is used in common for all the output links, and connected to the control bus 6, to store port data accommodated in the respective output links. The stored port data are given to the port pointer registers 8a and 8b. The link/port control circuit 10 controls the inputs/outputs of the port pointer registers 8a and 8b and the port list table 9, respectively.

The cell routing tags are transferred to the routing tag input bus 5 through a switch input section (not shown). The control data to the address generating circuit are transferred to the control bus 6. The write and read addresses in and from the cell buffers are transferred to the address pointer output bus 7. Here, the positional relationship of the respective address generating units 4 corresponds to the arrival sequence of the cells. Therefore, the arrival times of the cells corresponding to the address generating units 4 positioned on the lower side (lower order) are earlier than the arrival times of the cells corresponding to the address generating units 4 positioned on the upper side (higher order) in FIG. 1B.

At the initialization, the ports accommodated in the respective output links are written to the port list table 9 in such a way that a written port number becomes an address for reading the succeeding port number. In addition, a port number used as a head of each output link is set to the port pointer registers 8a and 8b, respectively. In the example shown in FIG. 2, for instance, four ports having port numbers 0, 4, 7 and 2 are accommodated in the link-"0" port pointer 8a in this order, so that the head port number is 0. In the same way, four ports having port numbers 1, 3, 6 and 5 are accommodated in the link-"1" port pointer 8b in this order, so that the head port number is 1.

The address generating circuit as described above functions on the basis of three (input, output and shift) operations as follows:

In the input operation, data cells are inputted. In the input operation, port data and output link data each attached to a data cell are transferred to the address generating circuit, and vacant columns of the corresponding link of the address generating circuit are searched beginning from the lower-order side. The routing tags (port and link data) are inputted to the first-searched vacant column. Further, the address pointer value of the column is transferred to the cell buffer 11 to write the transferred cell in the cell buffer 11.

Figure 2:
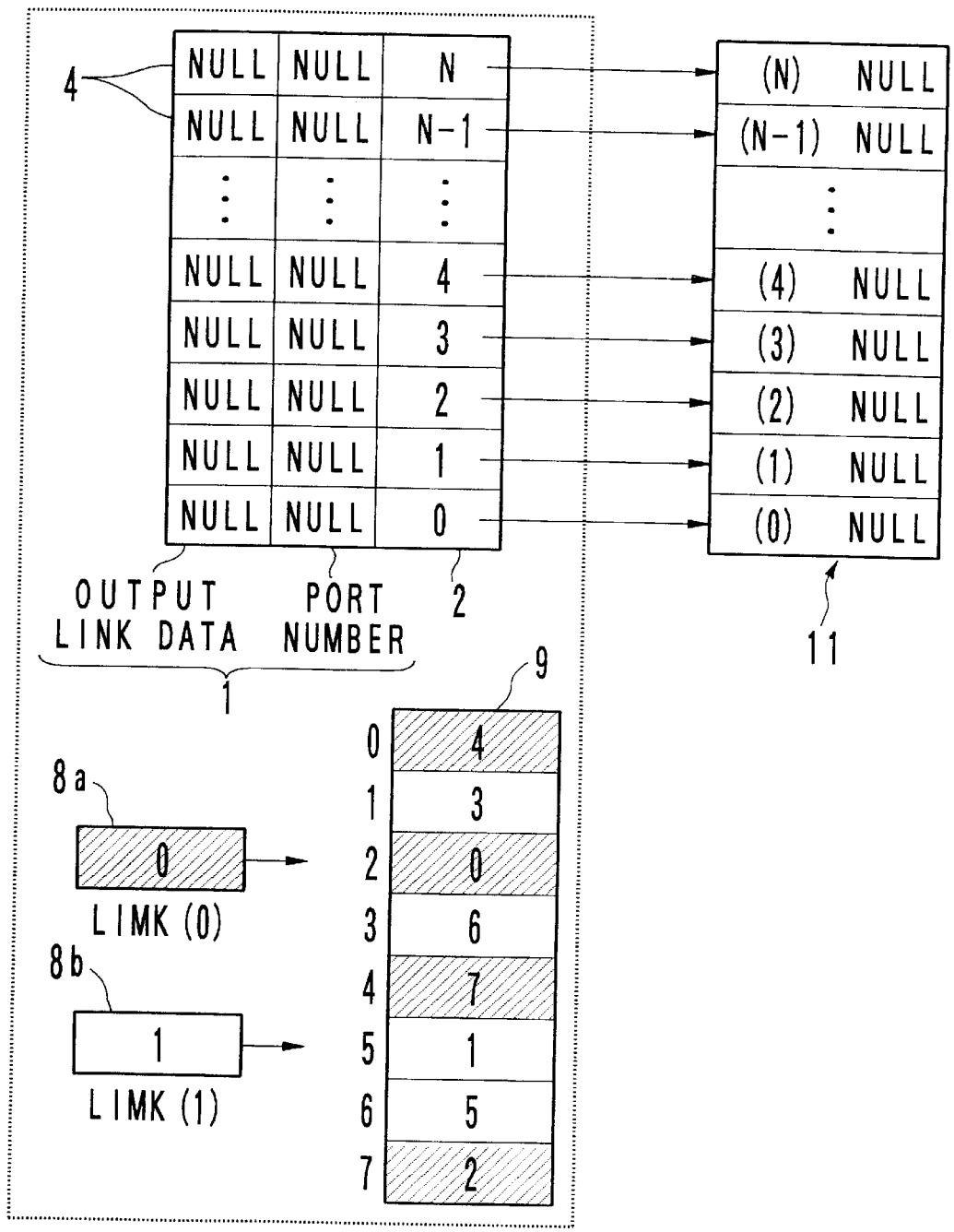
FIG. 2 is a view showing initial internal states of an address generating circuit shown in FIG. 1B and cell buffers.
Figure 3:
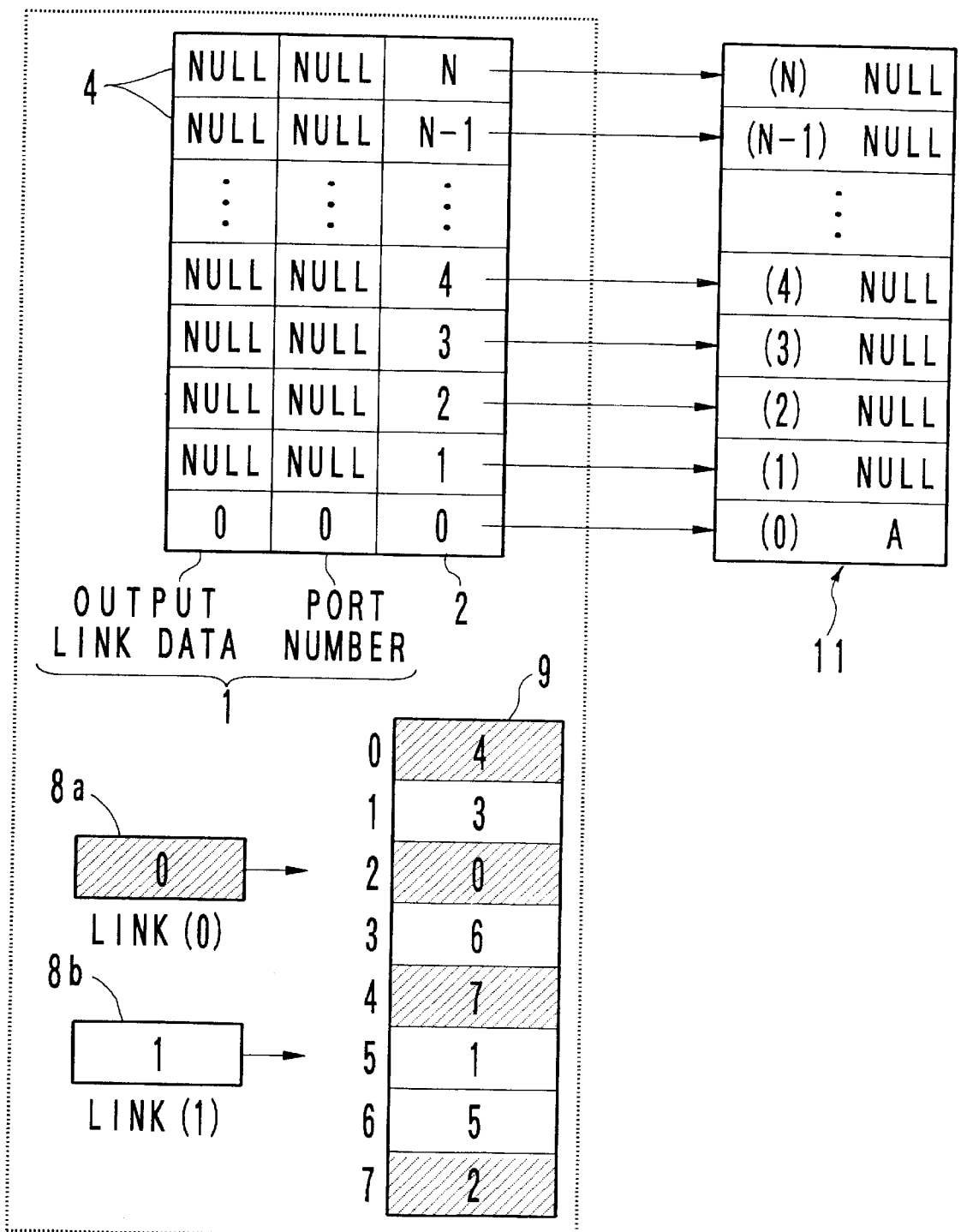
FIG. 3 is a view showing the internal states of the address generating circuit and the cell buffers obtained when a cell A has been inputted from the initial states shown in FIG. 2.
Figure 4:
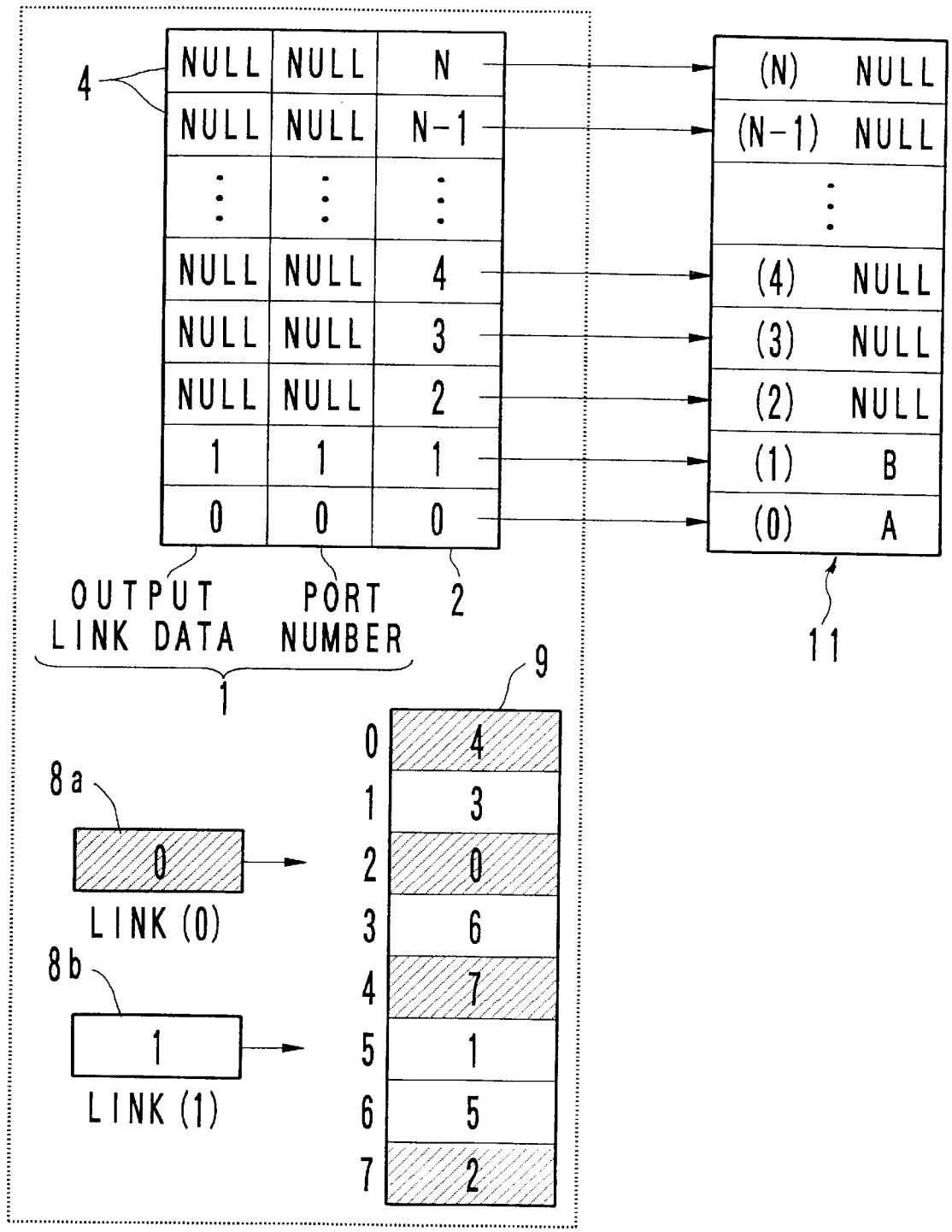
FIG. 4 is a view showing the internal states of the address generating circuit and the cell buffers obtained when a cell B has been inputted from the internal states shown in FIG. 3.
Figure 5:
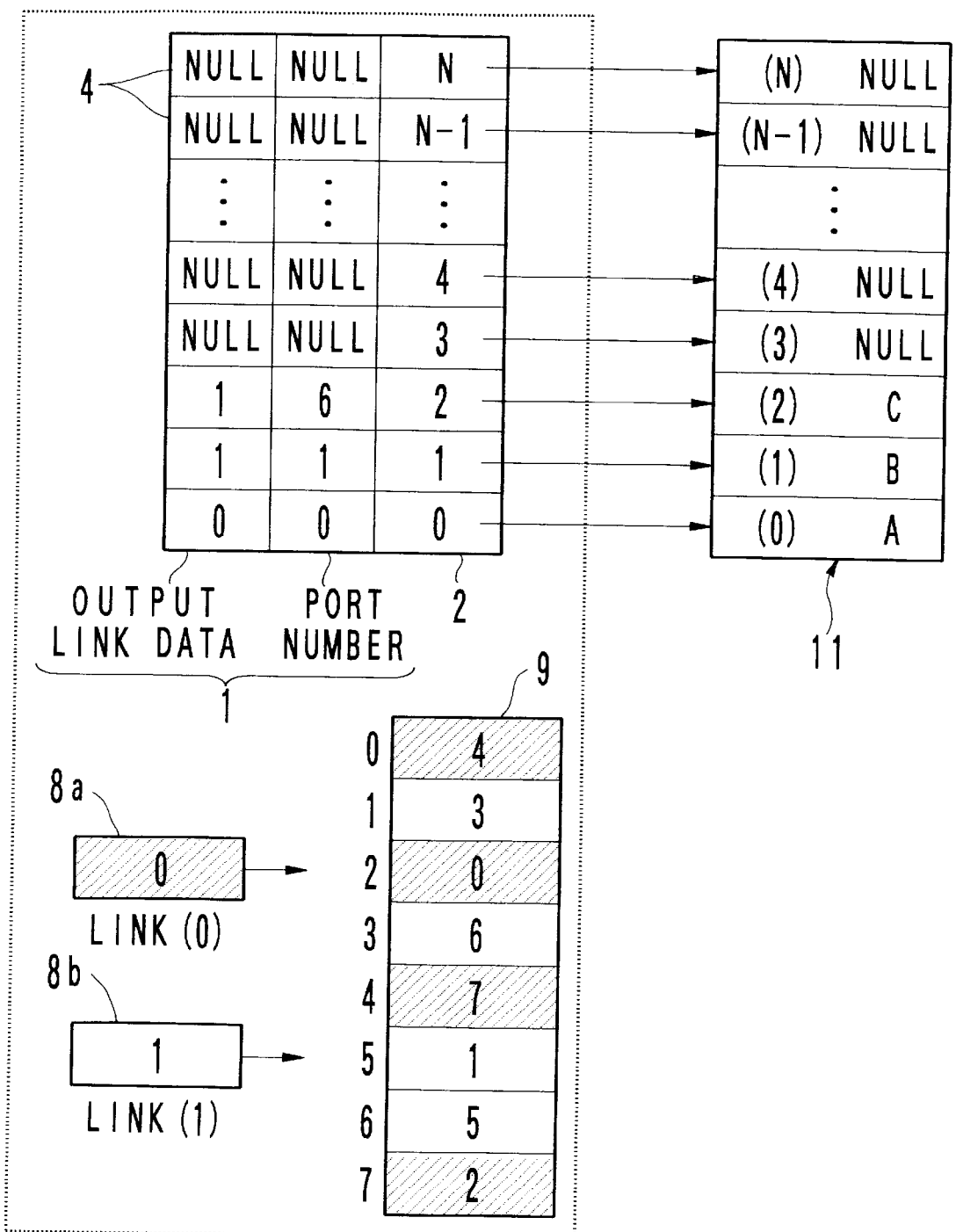
FIG. 5 is a view showing the internal states of the address generating circuit and the cell buffers obtained when a cell C has been inputted from the internal states shown in FIG. 4.
Figure 6:
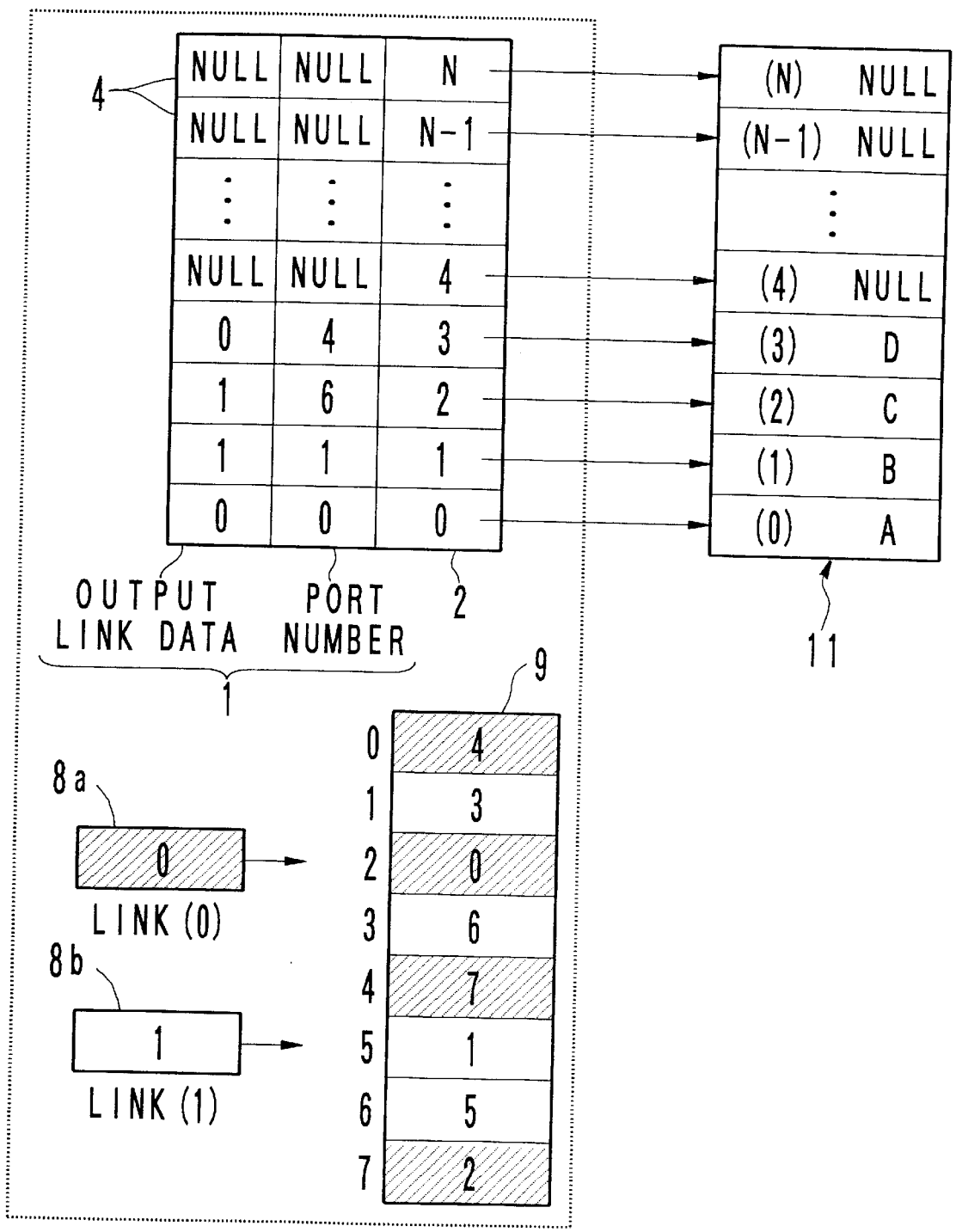
FIG. 6 is a view showing the internal states of the address generating circuit and the cell buffers obtained when a cell D has been inputted from the internal states shown in FIG. 5.

FIG. 2 shows the initial internal states of the address generating circuit and the cell buffers. FIG. 3 shows the internal states of the address generating circuit and the cell buffers obtained when a cell A having the routing tag (link) 0 and the port 0 has been inputted from the internal states shown in FIG. 2; FIG. 4 shows the internal states of both obtained when a cell B having the routing tag (link) 1 and the port 1 has been inputted from the internal states shown in FIG. 3; FIG. 5 shows the internal states of both obtained when a cell C having the routing tag (link) 1 and the port 6 has been inputted from the internal states shown in FIG. 4; and FIG. 6 shows the internal states of both obtained when a cell D having the routing tag (link) 0 and the port 4 has been inputted from the internal states shown in FIG. 5. That is, FIGS. 3 to 6 show the changes in the internal states of the address generating circuit and the cell buffers beginning from the initial states shown in FIG. 2 in time series manner.

In the output operation, data cells are outputted. In the output operation, the columns of the address generating circuit, which have the routing tags matching the output link and the output port both set to the port pointer registers 8a and 8b for each output link, are searched beginning from the lower-order side. An address pointer value of the first-searched column is transferred to the cell buffer 11, to read the data cell from the corresponding cell buffer 11. Further, the routing tags of the column from which the data cell has been outputted are both reset. At the same time, the port list table 9 is accessed on the basis of the addresses of the port pointer registers 8a and 8b, to read a port to be searched in the succeeding cell cycle. The read port is set to the port pointer register 8a or 8b.

Figure 7:
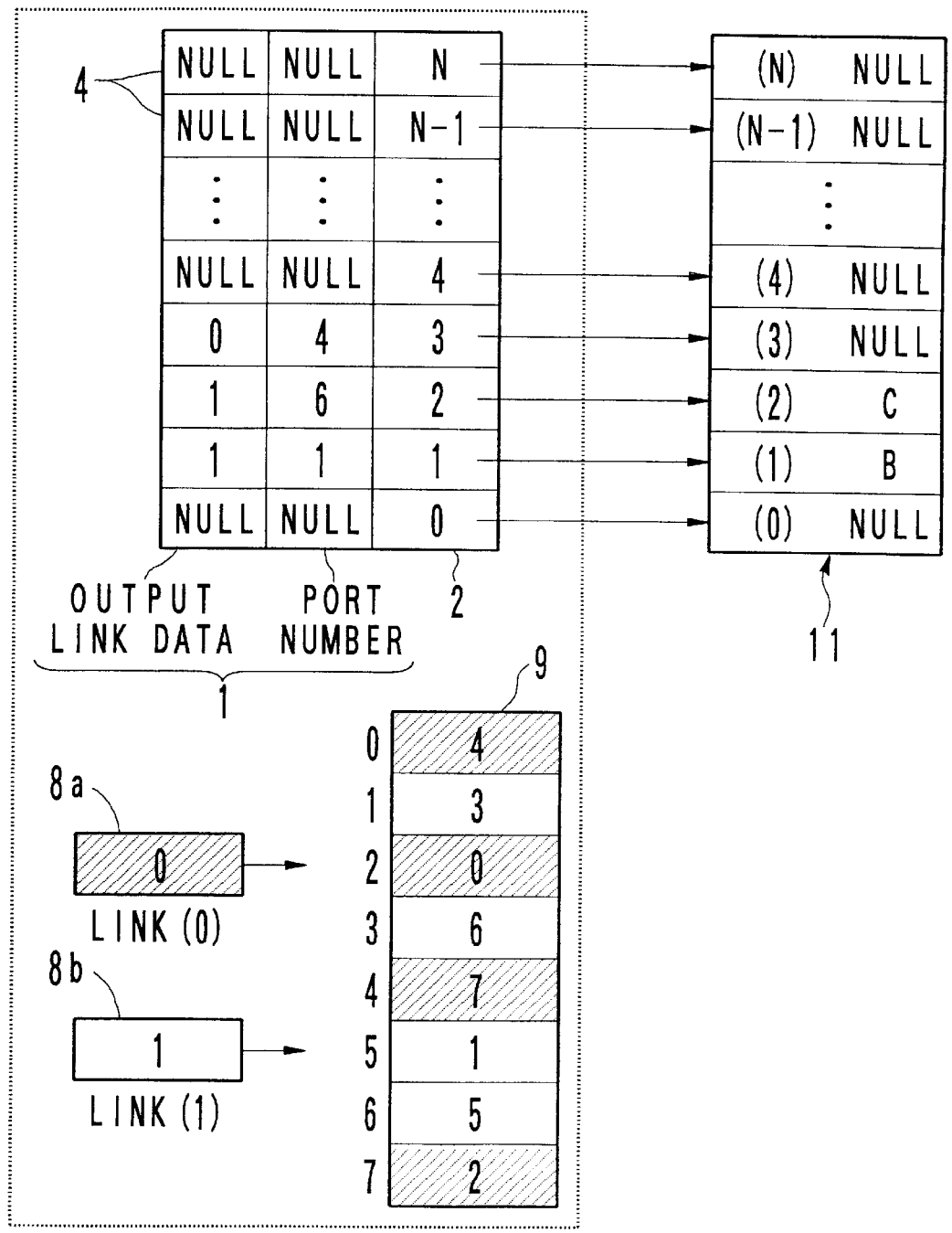
FIG. 7 is a view showing the internal states of the address generating circuit and the cell buffers obtained when the cell A has been outputted from the internal states shown in FIG. 6.
Figure 8:
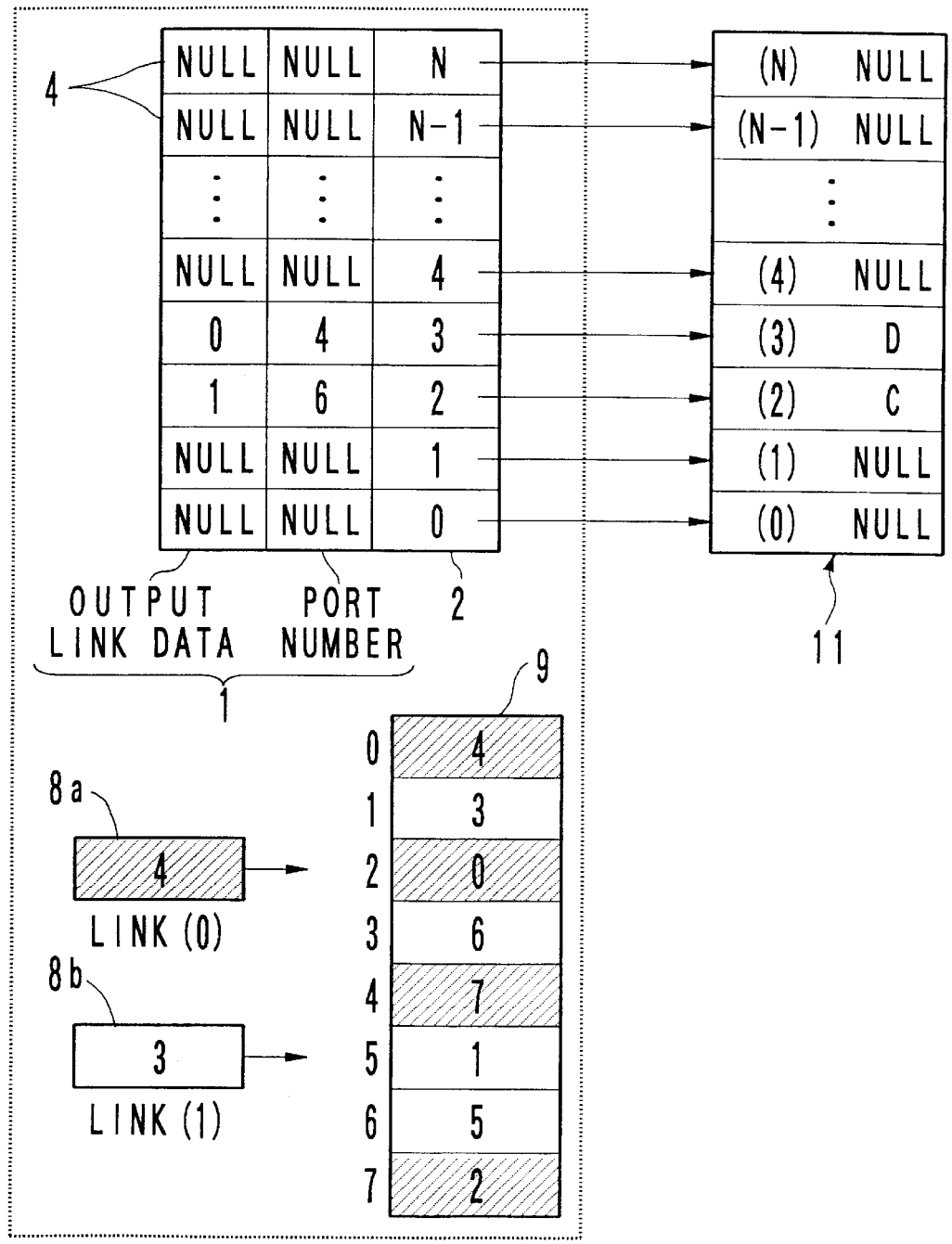
FIG. 8 is a view showing the internal states of the address generating circuit and the cell buffers obtained when the cell B has been outputted from the internal states shown in FIG. 7.

FIG. 7 shows the internal states of the address generating circuit and the cell buffers obtained when the cell A of the port 0 to be transmitted to the output link 0 has been outputted from the internal states shown in FIG. 6; and FIG. 8 shows the internal states of both obtained when the cell B of the port 1 to be transmitted the output link 1 has been outputted from the internal states shown in FIG. 7. That is, FIGS. 7 and 8 show the changes in the internal states of the address generating circuit and the cell buffers beginning from the internal states shown in FIG. 6 in time series manner.

As shown in FIG. 7, in parallel to the output operation of the cell of the port 0 to be transmitted to the output link 0, data ("4") of the address 0 is read from the port list table 9, and then set to the link-0 port pointer 8a. In the same way, as shown in FIG. 8, in parallel to the output operation of the cell of the port 1 to be transmitted to the output link 1, data ("3") of the address 1 is read from the port list table 9, and then set to the link-i port pointer 8b. Further, the column from which the data cell had been outputted is changed to a vacant column.

In the shift operation, data cells are shifted in sequence to fill the vacant columns caused by the output operation. In the shift operation, the vacant columns of the address generating circuit are searched beginning from the lower-order side. The values of the address pointer registers 8a and 8b of the first-searched vacant column are transferred to the address pointer output bus 7, and further the column values just over the first-searched column are shifted to a one-stage lower column. Further, the values of the address pointers outputted to the address pointer bus 7 are inputted to the uppermost stage column.

Figure 9:
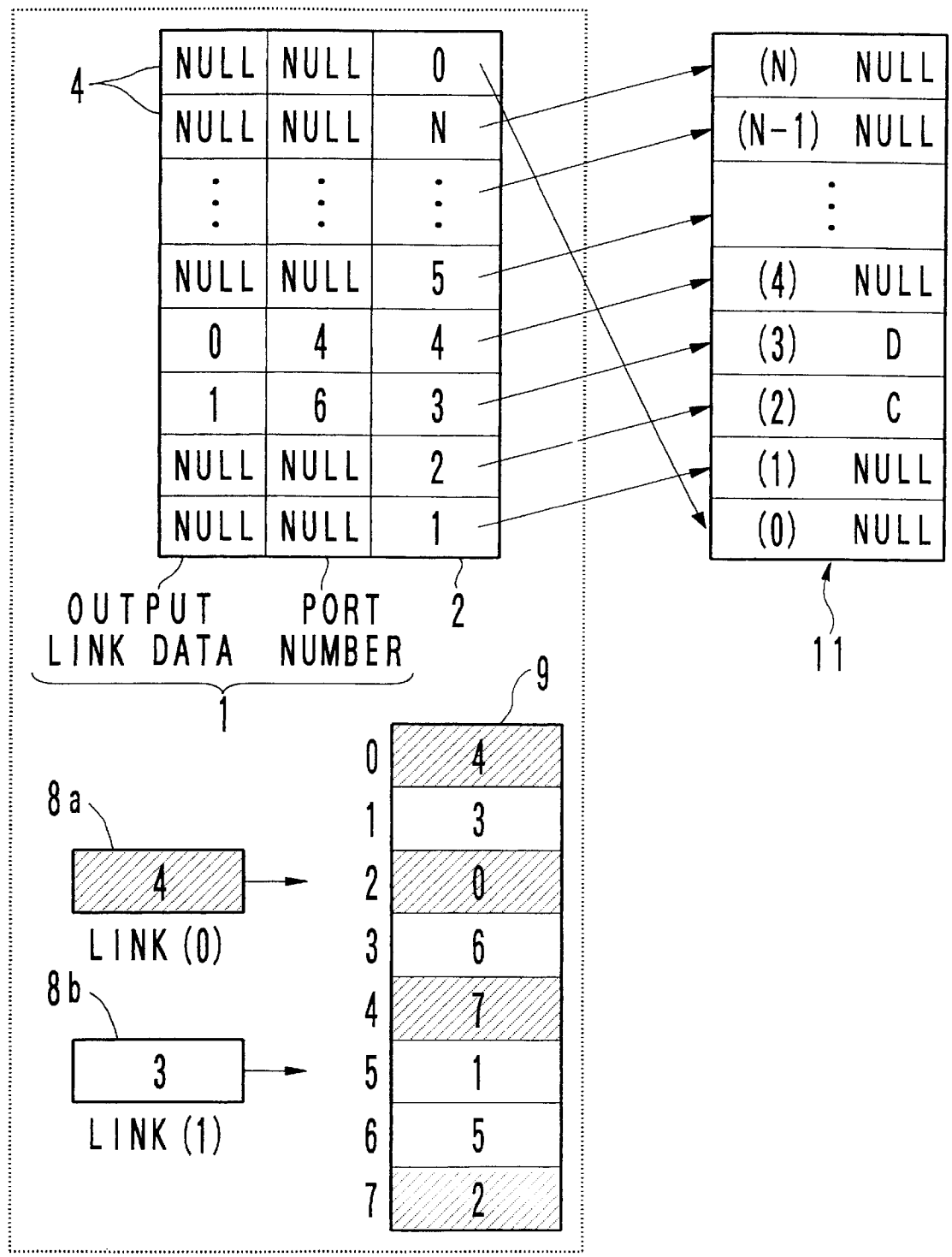
FIG. 9 is a view showing the internal states of the address generating circuit and the cell buffers obtained when one cell has been shifted from the internal states shown in FIG. 8.
Figure 10:
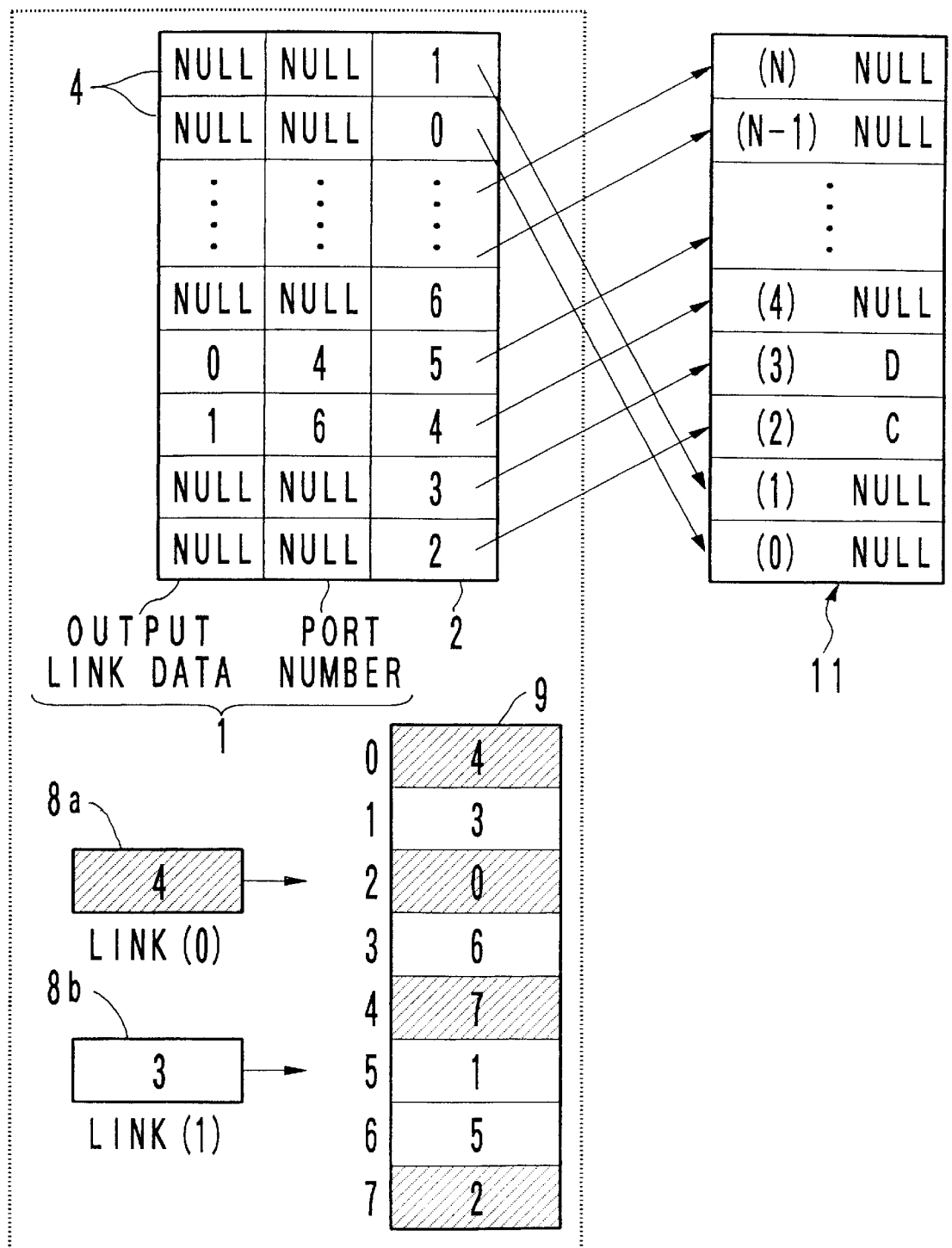
FIG. 10 is a view showing the internal states of the address generating circuit and the cell buffers obtained when another cell has been further shifted from the internal states shown in FIG. 9.
Figure 11:
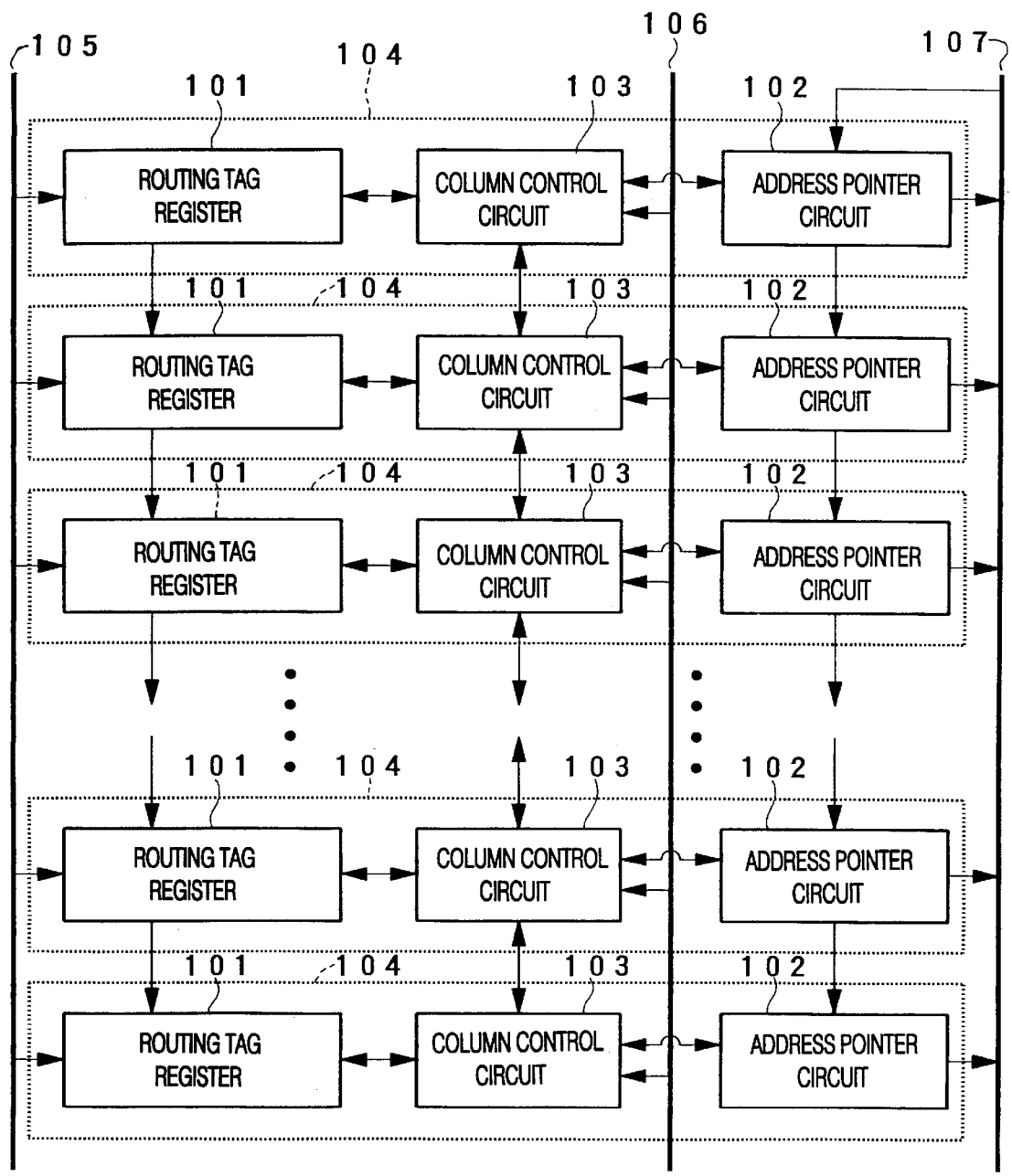
FIG. 11 is a circuit diagram showing a prior art shift-register type address generating circuit of an ATM switch.
Figure 12:
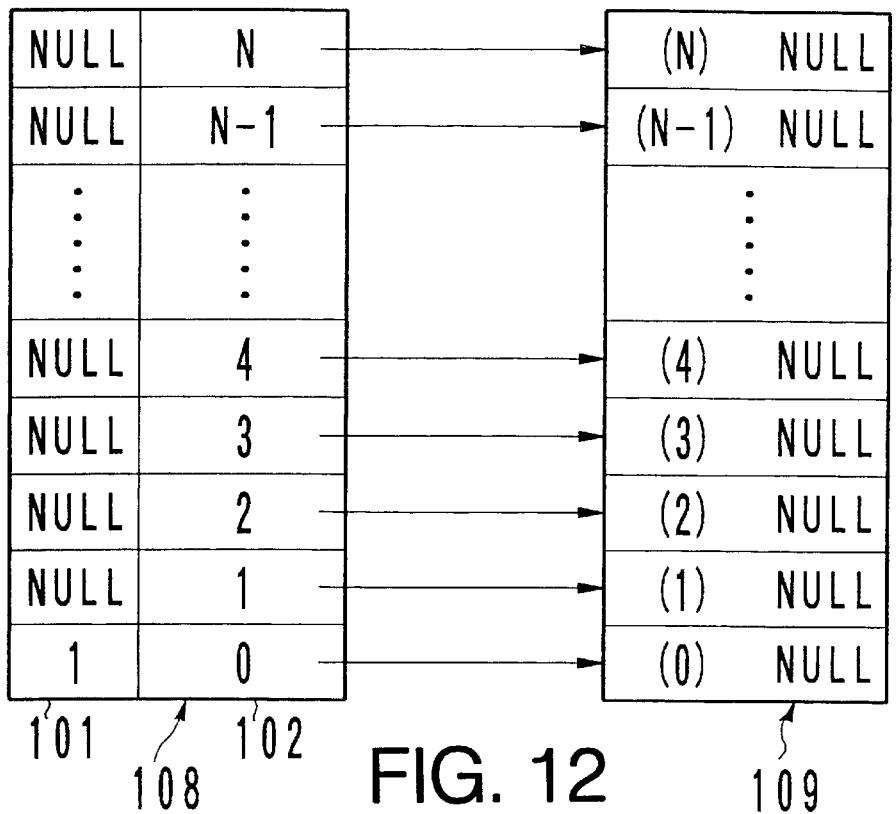
FIG. 12 is a view showing initial internal states of an address generating circuit shown in FIG. 11 and cell buffers.
Figure 13:
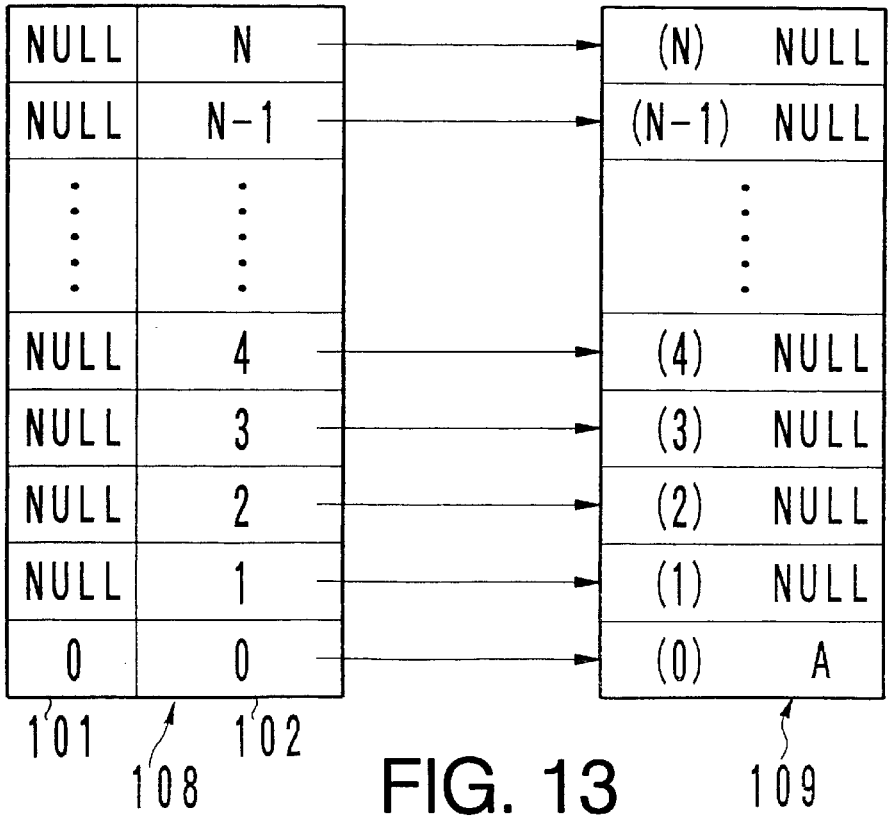
FIG. 13 is a view showing the internal states of the address generating circuit and the cell buffers obtained when a cell A has been inputted from the initial states shown in FIG. 12.
Figure 14:
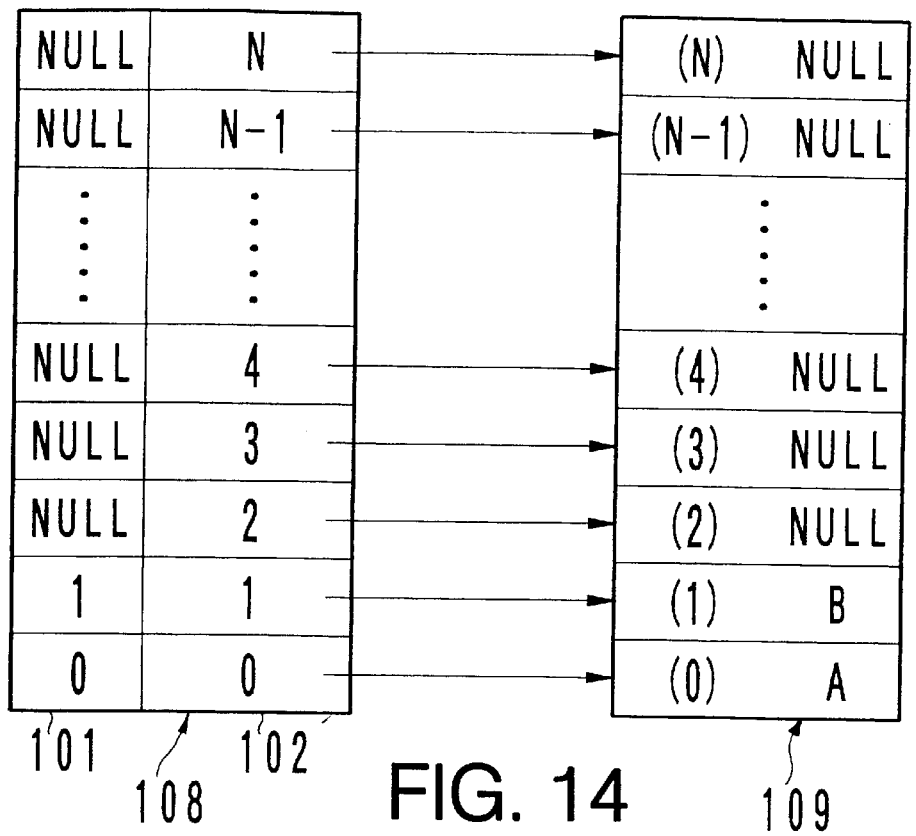
FIG. 14 is a view showing the internal states of the address generating circuit and the cell buffers obtained when a cell B has been inputted from the internal states shown in FIG. 13.
Figure 15:
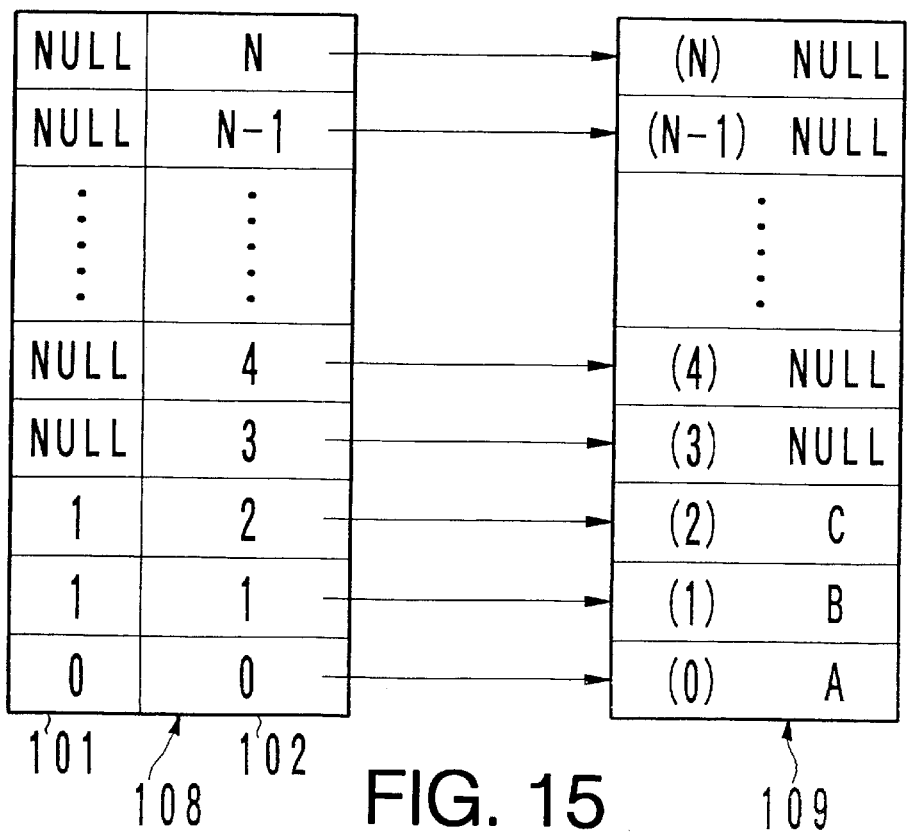
FIG. 15 is a view showing the internal states of the address generating circuit and the cell buffers obtained when a cell C has been inputted from the internal states shown in FIG. 14.
Figure 16:
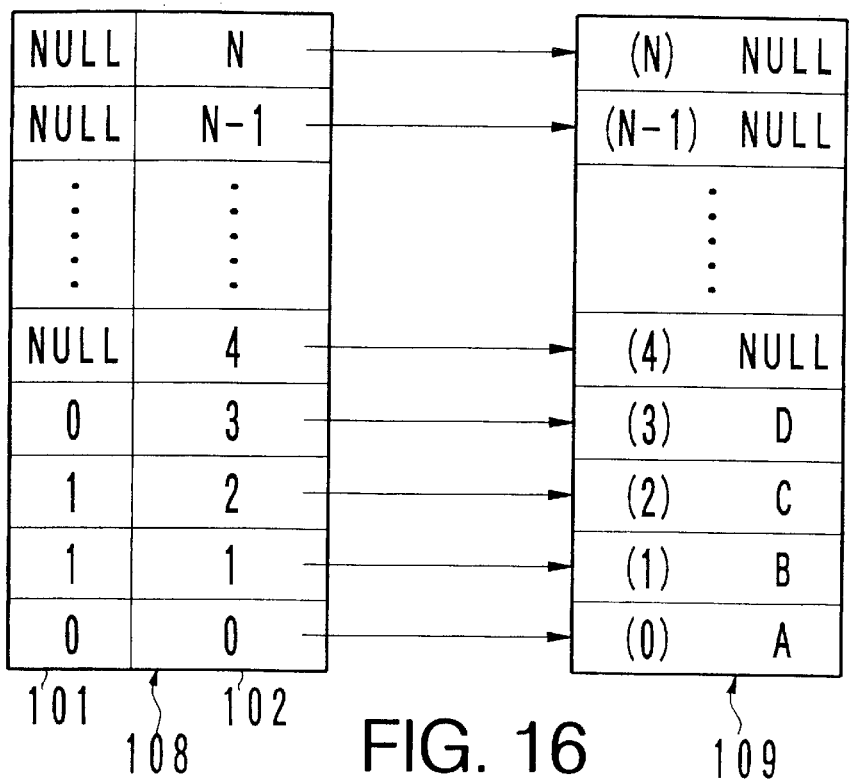
FIG. 16 is a view showing the internal states of the address generating circuit and the cell buffers obtained when a cell D has been inputted from the internal states shown in FIG. 15.
Figure 17:
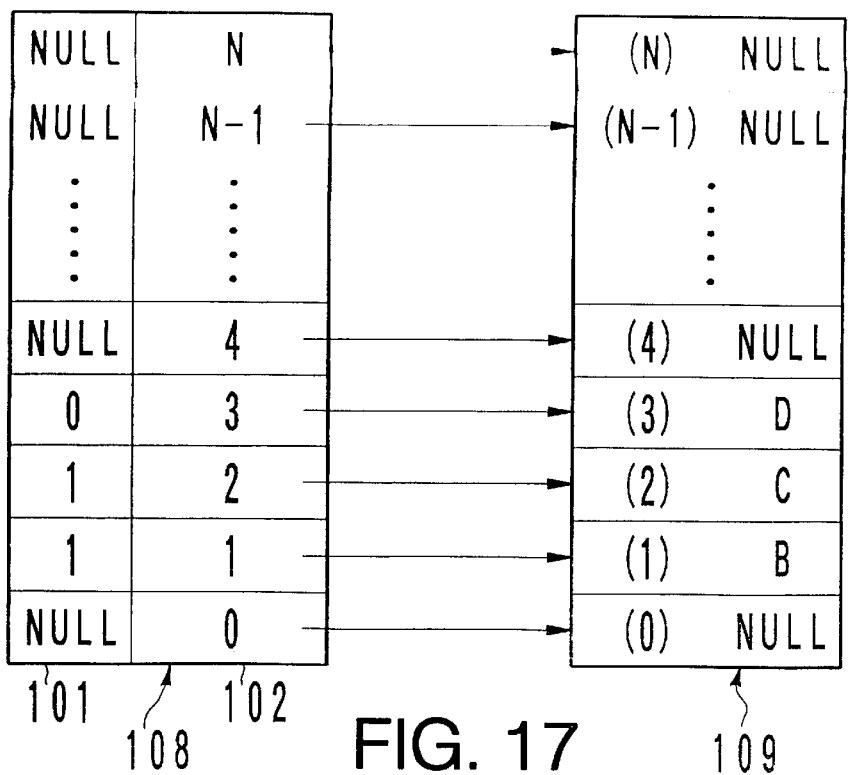
FIG. 17 is a view showing the internal states of the address generating circuit and the cell buffers obtained when the cell A has been outputted from the internal states shown in FIG. 16.
Figure 18:
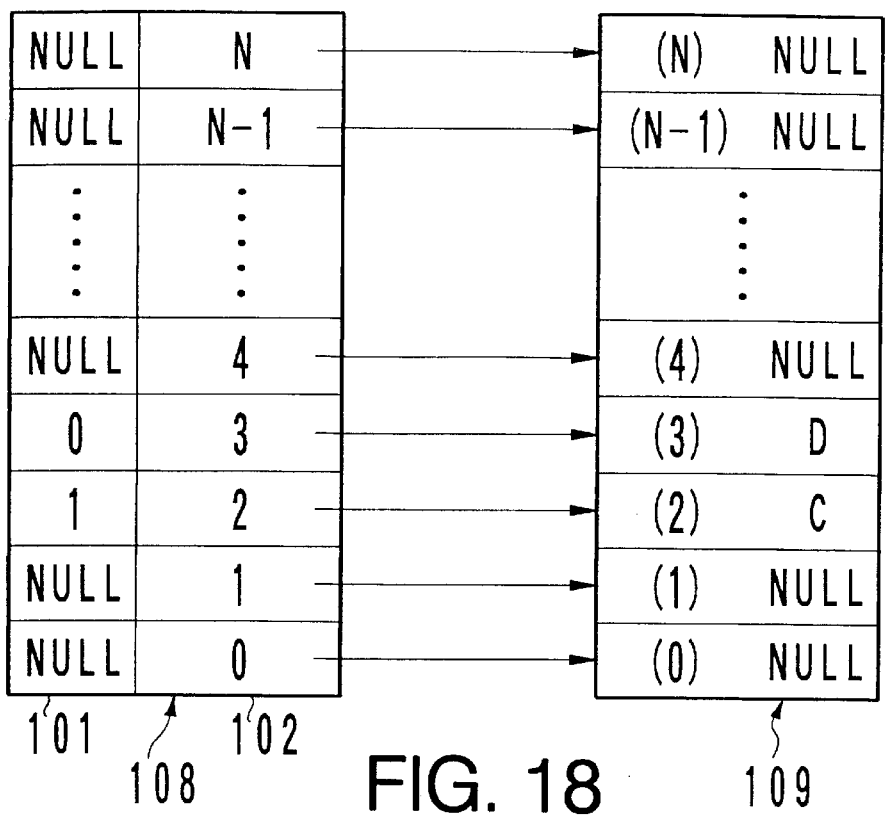
FIG. 18 is a view showing the internal states of the address generating circuit and the cell buffers obtained when the cell B has been outputted from the internal states shown in FIG. 17.
Figure 19:
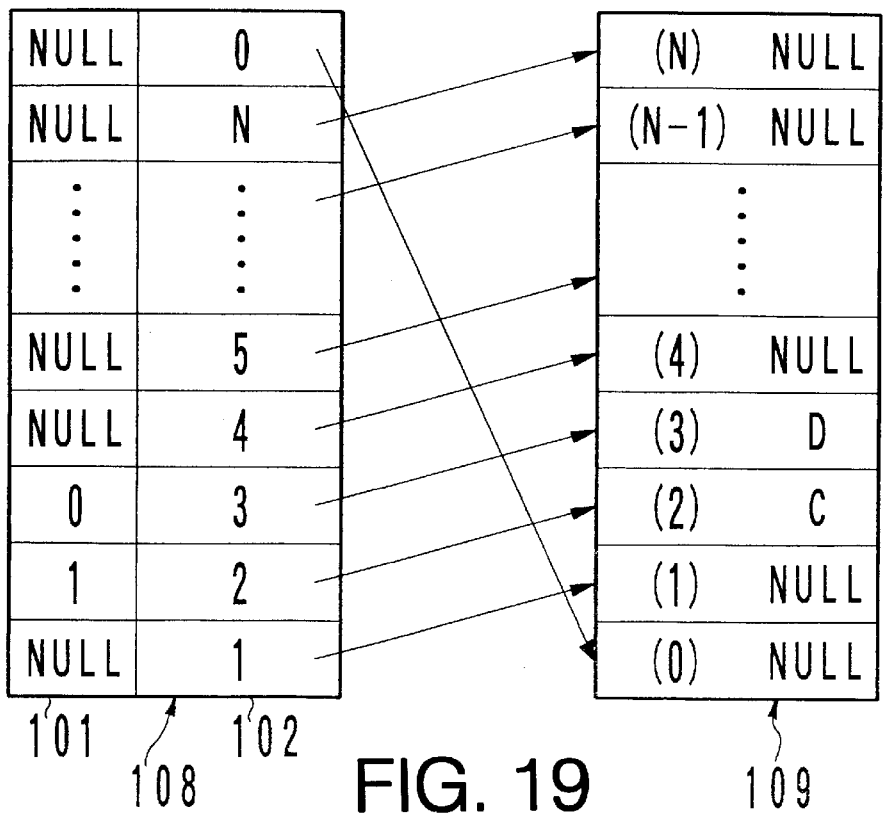
FIG. 19 is a view showing the internal states of the address generating circuit and the cell buffers obtained when one has been shifted from the internal states shown in FIG. 18.
Figure 20:
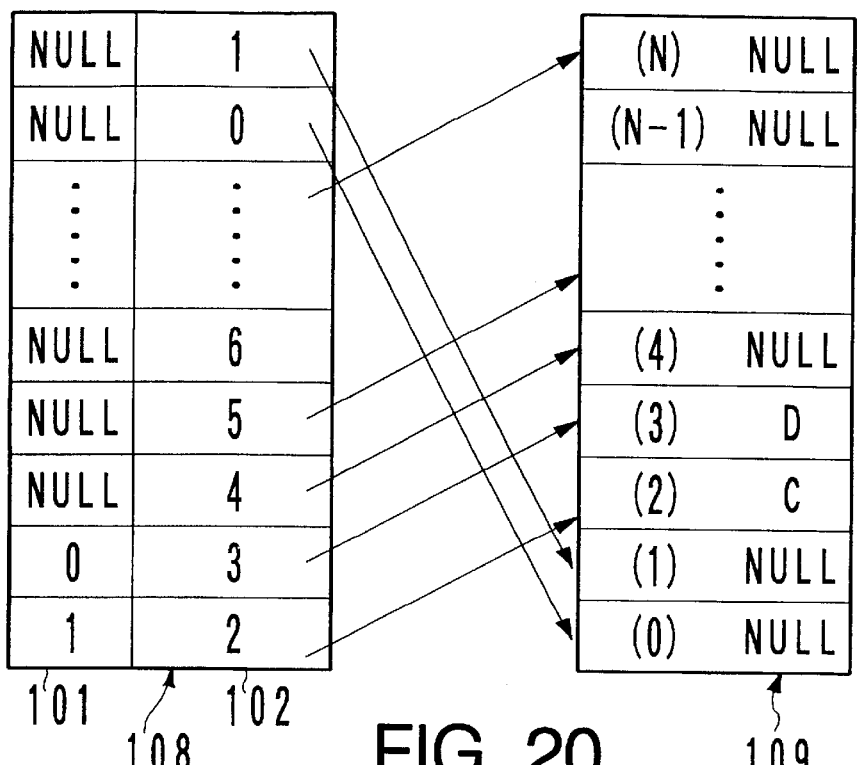
FIG. 20 is a view showing the internal states of the address generating circuit and the cell buffers obtained when another cell has been further shifted from the internal states shown in FIG. 19.
Figure 21:
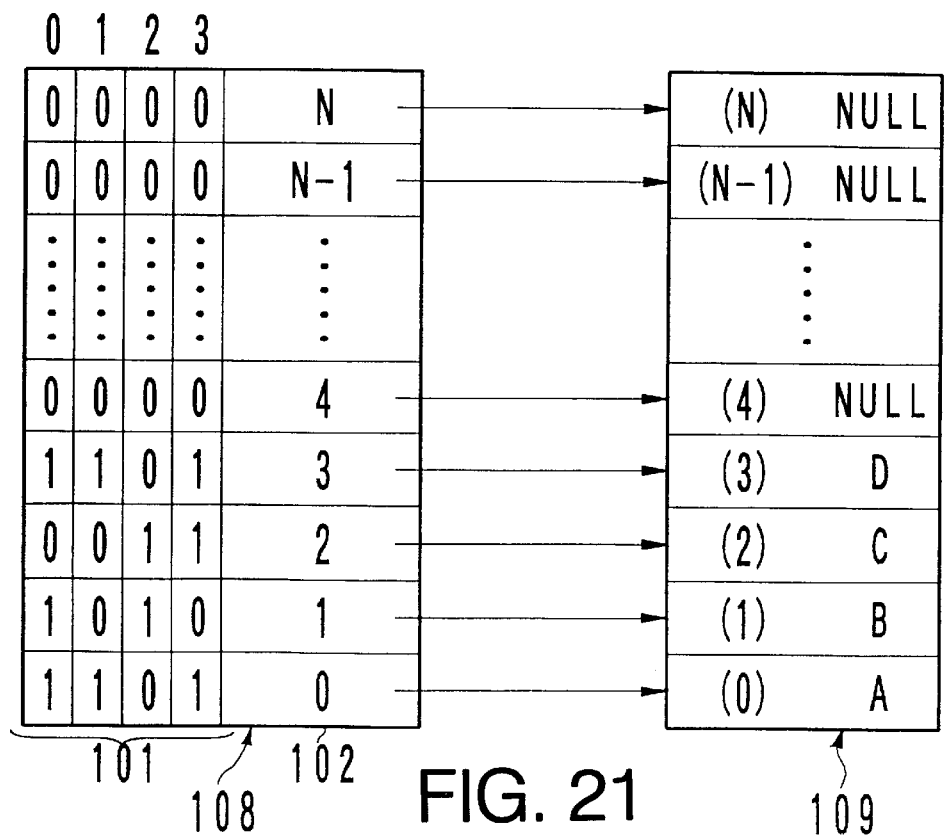
FIG. 21 is a circuit diagram showing a prior art address generating circuit and the cell buffers for an ATM switch provided with a multicasting function.

FIG. 9 shows the internal states of the address generating circuit and the cell buffers obtained when the shift operation has been executed once from the internal states shown in FIG. 8, so that one vacant column is filled with cell data. Further, FIG. 10 shows the internal states of the address generating circuit and the cell buffers obtained when the shift operation has been further executed once from the internal states shown in FIG. 9, so that one vacant column is further filled with cell data.

As described above, in the address generating circuit of the shared-buffer type ATM switch according to the present invention, it is possible to switch the ports multiplexed by time division for each input link to each output link through time division multiplexing.

Further, since the port list table 9 for storing the port numbers accommodated in the respective output links is not prepared in unit of output link (i.e., the port list table 9 can be used in common for all the links), it is possible to reduce the hardware.

Further, the port numbers can be allocated to the respective output links freely in any desired sequence. Further, since the ports are multiplexed by time division for each output link, it is possible to separate cells from the link to the ports by the switch output section easily by use of small hardware.

As described above, according to the present invention, since the address generating circuit of the shared-buffer type ATM switch comprises first storing means for storing output link data and port data of a cell stored in the cell buffer; second storing means for storing addresses on the shared cell buffers, third storing means for storing current output port number in unit of output link, and fourth storing means for enabling to read the succeeding output port number on the basis of the current port data as an address, it is possible to realize the time division multiplexing of the ports to the output link effectively, so that the network can be used and managed more finely.

What is claimed is:

1. An address generating circuit of shared buffer type asynchronous transfer mode switch used for an asynchronous transfer mode switching system, which comprises:
   a plurality of address generating units (4) each having:
     a routing tag register (1) for storing routing tag data composed of each cell port data and each cell output link data; and
     an address pointer register (2) for storing a write address of each cell in a cell buffer or a read address of each cell from the cell buffer;
   a plurality of port pointer registers (8a, 8b, 8c, ...) connected to said address generating units (4) and provided for each output link, for storing data indicative of a current output port for each output link; and
   a port list table (9) provided in common for all the output links, for storing port data,
   wherein an address of an output cell corresponding to the data indicative of the output port stored in said port pointer registers (8a, 8b, 8c, ...) is searched from said address generating units (4), and further data indicative of succeeding output port is read from said port list table (9) by using the data indicative of an output port stored in said port pointer registers (8a, 8b, 8c, ...) as an address.

2. The address generating circuit of claim 1, wherein each of said address generating units (4) further comprises a control circuit (3) for controlling input/output of said routing tag register (1) and said address pointer register (2).

3. The address generating circuit of claim 2, which further comprises:
   a routing tag input bus (5) connected to said routing tag registers (1) of said address generating units (4), for transferring routing tags from an external address inputting section to said routing tag registers (1);

a control bus (6) connected to said control circuits (3) of said address generating units (4), for transferring control data to said control circuits (3); and
   an address pointer output bus (7) connected to said address pointer registers (2) of said address generating units (4), said address pointer register (2) outputting to said address pointer output bus (7) a read or write address of said cell buffer.

4. The address generating circuit of claim 3, which further comprises a link/port control circuit (10) for controlling input/output of said port pointer registers (8a, 8b, 8c, ...) and input/output of said port list table (9).

5. An address generating circuit of shared buffer type asynchronous transfer mode switch used for an asynchronous transfer mode switching system, which comprises:
   first storing means (4) for storing addresses, port data, and output link data of cells stored in a shared buffer;
   second storing means (8a, 8b, 8c, ...) for storing data indicative of a current output port for each link; and
   third storing means (9) for storing port data stored for each output link,
   wherein an address of an output cell corresponding to the data indicative of the output port stored in said second storing means (8a, 8b, 8c, ...) is searched from said first storing means (4), and further data indicative of succeeding output port is read from said third storing means (9) by using the data indicative of an output port stored in said second storing means (8a, 8b, 8c, ...) as an address.

6. The address generating circuit of claim 5, wherein the address generating circuit is initialized by setting an output port stored in each output link to said third storing means (9), by setting the port data in such a way that written port data can be used as an address for reading succeeding port data, and by setting head port data for each output link to said second storing means (8a, 8b, 8c, ...).

7. An address generating circuit of shared buffer type asynchronous transfer mode switch used for an asynchronous transfer mode switching system, which comprises:
   a plurality of address generating units (4) mutually connected, each including:
     a routing tag register (1) for storing a routing tag having cell port data and output link data;
     an address pointer register (2) for storing a read address of a cell read from a cell buffer (11) or a write address of a cell written in the cell buffer (11); and
     a column control circuit (3) for controlling input/output of said routing tag register (1) and said address pointer register (2);
   a routing tag input input bus (5) connected to said routing tag registers (1) of said address generating units (4), for transferring routing tags from an external address inputting section to said routing tag registers (1);
   a control bus (6) connected to said column control circuits (3) of said address generating units (4), for transferring control data to said column control circuits (3);
   an address pointer output bus (7) connected to said address pointer registers (2) of said respective address generating units (4), for transferring read addresses or write addresses of cells stored in said address pointer registers (2);
   port pointer registers (8a, 8b, 8c ...) connected to said control bus (6), for storing data indicative of current output port data for each output link and for transmitting the stored data to said column control circuits (3) via said control bus (6);

a port list table (9) connected to said control bus (6) in common for all the output links, for storing port data for each output link and for transmitting stored port data to said port pointer registers (8a, 8b, 8c, . . .); and a link/port control circuit (10) for controlling input/output of said port pointer registers (8a, 8b, 8c, . . .) and said port list table (9).

8. The address generating circuit of claim 7, wherein an address of an output cell corresponding to the data indicative of the output port stored in said port pointer register is searched from said address pointer register (2) of said address generating unit (4), and further data indicative of a succeeding output port is read from said port list table (9) by using the data indicative of the output port stored in said port pointer register as an address.

9. The address generating unit of claim 8, wherein the address generating circuit is initialized by setting an output port stored in each output link to said port list table (9), by setting the port data in such a way that the written port data can be used as an address for reading succeeding port data, and by setting head port data for each output link to said port pointer registers, respectively.

* * * * *